Oct. 25, 1966   H. FLECKENSTEIN ET AL   3,281,636
BATTERY HAND GADGET
Original Filed May 13, 1958
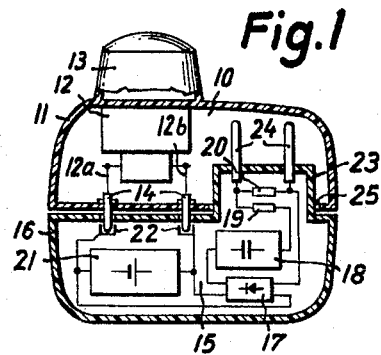
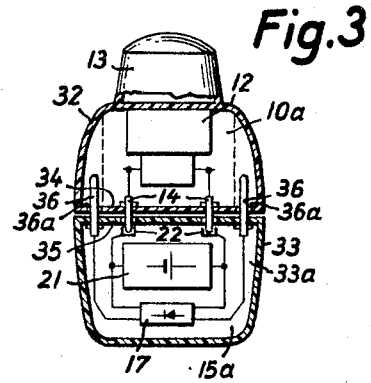
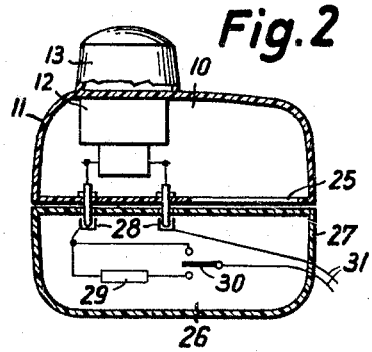
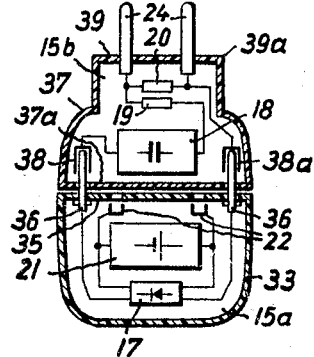
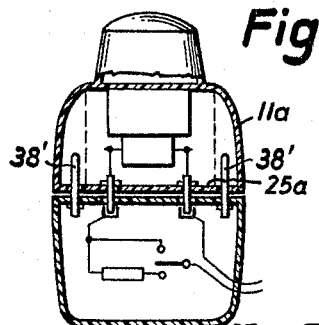
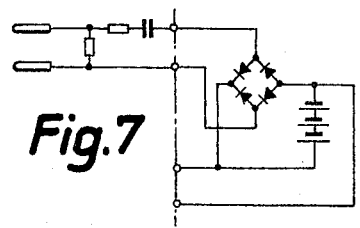
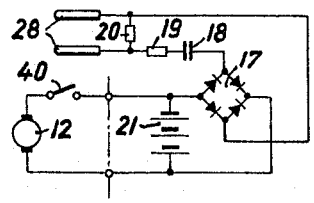
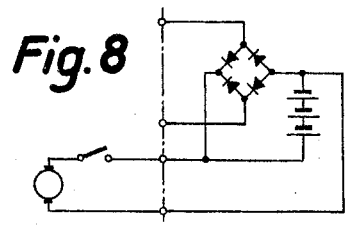
Inventors
HANS FLECKENSTEIN
GÜNTER GROTHUSMANN
BY: Toulmin & Toulmin
ATTORNEYS

United States Patent Office 3,281,636
Patented Oct. 25, 1966

3,281,636
BATTERY HAND GADGET
Hans Fleckenstein, Oldenburg in Oldenburg, Günter Grothusmann, Recklinghausen, Germany, assignors to Licentia Patent-Verwaltungs-G.m.b.H., Hamburg, Germany
Original application May 13, 1958, Ser. No. 734,996. Divided and this application May 20, 1963, Ser. No. 293,558
Claims priority, application Germany, May 15, 1957, L 27,652
5 Claims. (Cl. 320—2)

This is a division of application Serial No. 734,996, filed May 13, 1958, and now abandoned.

The present invention relates to hand gadgets operated by an electric motor and a battery associated with battery recharging means.

Battery hand gadgets are known and used for various purposes such as, for example, flash lights, cigarette lighters, gas lighters, and other devices having an incandescent light bulb or filament. There are also known devices driven by a small electric motor fed by a battery, such as for example midget vacuum cleaners used for cleaning table plates, or pocket ventilators or fans, electric razors, and the like.

In these known devices, the exhausted accumulator had to be removed for recharging. It has already been proposed to facilitate the recharging operation by very small recharging devices, for example in the form of intermediate plugs. However, the removal and replacement of the accumulator battery is undesirable because it requires a number of manipulations and a particular attention to avoid an erroreous changing of the poles.

It has therefore been proposed to provide battery recharging means within the casing including the accumulator battery for a pocket flash light. The recharging operation in this gadget is comparatively simple as the flash light is provided with the plug which can be connected to the mains by insertion into any ordinary socket in a wall. However, the insertion of the battery recharging means increases the weight as well as the size of the casing and the entire gadget. While this increase remains within reasonable limits, in very small gadgets requiring only very little current, as, for example, pocket flash lights and the like, the increase in weight and size is prohibitory in gadgets comprising a work-performing element driven by an electric motor. This will be easily apparent upon comparing the weight and size of a work performing element, for example a razor, and an electric motor, to those of a small light bulb. In addition, it will be necessary—for safety reasons—to insulate the device with respect to the mains voltage which is, of course, much higher than the battery voltage.

It is an object of the present invention to provide a hand gadget comprising a work-performing element, an electric motor, a battery or current source connector and battery recharging means, in which the exhausted battery can be recharged in a very simple manner with a minimum of manipulations and a minimum of attention of the operator.

It is another object of the present invention to provide a hand gadget comprising a work-performing element, an electric motor, a battery or current source connector and battery recharging means, in which an insulation adapted to the voltage of the battery is sufficient.

It is a further object of the present invention to provide a hand gadget comprising a work-performing element, an electric motor, a battery or current source connector and battery recharging means, which has a comparatively small weight and size.

It is yet another object of the present invention to provide a hand gadget comprising a work-performing element, an electric motor, a battery or current source connector and battery-recharging means, which can be connected, for operation of the motor or recharging of the battery respectively, to any current source.

It is still another object of the present invention to provide a hand gadget comprising a work-performing element, an electric motor, a battery or current source connector and battery-recharging means, which can be easily handled, operated and repaired.

It is yet a further object of the present invention to provide a hand gadget comprising a work-performing element, an electric motor, a battery or current source connector and battery-recharging means, and which is composed of at least two separate but complementary units which can be very easily put together to form the ready-to-operate gadget or to recharge the battery and in which the gadget has a small, pleasant, form-closed appearance.

These objects are achieved by the present invention, according to which the gadget is composed of at least two separate but complementary units, each unit comprising the necessary elements necessary to perform a function needed for the operation of the entire gadget, which units are adapted to be joined together in combinations of two units performing a combination of their individual functions, with their respective casings forming together a form-closed housing.

For example, the gadget may be composed according to the invention of two such units, one unit comprising an electric motor and a work-performing element (for example a razor or a fan), the other unit containing the battery and battery charging means.

According to another preferred embodiment of the invention, the gadget is divided into three separate but complementary units, the first unit comprising the electric motor and a work-performing element, the second unit comprising the battery and, preferably, a rectifier, the third unit comprising the battery recharging means, the first and the second unit form, if joined together, the ready-to-operate gadget, while the battery can be recharged if the battery unit is joined together with the battery recharging unit, after having been removed from the first unit comprising the electric motor and the work-performing element.

According to still another embodiment of the invention, the battery unit is replaced by a current source-connector unit adapted to supply the electric motor with current from the mains or any other current source.

The individual units can be joined together in a very simple manner by plug pins provided on the housing of one unit, which are inserted into the housing of the other unit to be joined. These mechanical connecting means can also be used as electrical connections.

The invention will be better understood upon reference to the accompanying drawings illustrating the composite hand gadget of the invention by way of the example of an electric razor, and wherein:

FIGURE 1 is a schematic sectional view of the entire gadget composed of two units, an electric motor unit and a battery and battery charging unit;

FIGURE 2 is a schematic sectional view of the entire gadget composed of two units, an electric motor unit and a current source connector unit;

FIGURE 3 is a schematic sectional view of the entire gadget comprising three units and showing the combination of the electric motor unit and the battery unit;

FIGURE 4 is a schematic sectional view of the entire gadget comprising three units and showing the combination of the battery charging unit and the battery unit;

FIGURE 5 is a schematic sectional view of the entire gadget comprising three units and showing the combination of the electric motor unit and a current source connector unit;

FIGURE 6 is a wiring diagram of the device shown in FIGURE 1;

FIGURE 7 is a wiring diagram of the device shown in FIGURE 4;

FIGURE 8 is a wiring diagram of the device shown in FIGURE 5.

Referring now to the drawings more in detail, the electric motor-unit 10 has an electric motor 12 disposed within housing 10 and driving the blades in a head 13 of an electric razor. The leads 12a and 12b of the electric motor 12 are connected to the plug pins 14 and 14a, respectively.

The battery and battery-charging unit 15 are disposed in a housing 16. An accumulator battery 21 with the connector socket 22 from the battery portion of this unit, while the battery-charging unit is composed of the rectifier 17 with the charging capacitor 18, the series resistance 19 and the capacitor-discharge resistance 20. The casing 16 has a projecting portion 23, serving as a plug with the plug pins 24. The casing 11 has a corresponding recess 25 adapted to receive the plug 23. The two units 10 and 15 are joined by inserting the plug pins 14 and 14a into the corresponding connector socket 22.

After a determined period of operation of the electric razor the current source driving the electric motor 12, i.e., the accumulator battery 21 will have to be recharged. This is done by removing the battery and battery-charging unit 15 from the electric motor unit 10 by pulling the plug pins 14 and 14a out of the corresponding connector socket 22. The separate battery and battery-charging unit 15 is then connected with its plug pins 24 to an ordinary plug of the mains, whereupon it is recharged by current flowing from the mains to the recharging portion which, in turn, recharges the accumulator battery 21.

The recharging portion of unit 15 and particularly the capacitor 18 and the two resistances 19 and 20 can be so adapted that the recharging can be effected by A.C. current having 220 volts as well as 125 volts. If a more rapid recharging of the battery is desired, the series resistance 19 can be provided with subdividing and switch means known per se.

As the connecting elements 24, 14 and 22 are mounted at the respective inner sides of the units 10 and 15, the plug pins 24 are covered and are not accessible whenever the two units are joined so as to form the integral ready-to-operate gadget. This applies also to the sockets 22 of the battery and battery-charging unit 15 whenever the latter is removed from the electric motor unit 10 and is connected to the plug of the mains for recharging, as the conventional plugs for the mains are generally attached to a wall, with the sockets 22 facing this wall.

In the embodiment shown in FIGURE 2 the hand gadget is again composed of two separate but complementary units 10 and 26. The electric motor unit 10 is identical to the unit 10 shown in FIGURE 1.

However, the battery and battery-charging unit 15 of the embodiment shown in FIGURE 1 is replaced by a unit 26 which is merely composed of connector means for connecting the gadget to a current source. This unit consists of a housing 27, the pair of connector sockets 28 connected with the series resistance 29 and the connecting leads 31, one end of the latter being connected with the switch 30. The connecting leads are connected to a power source (not shown), for example a D.C. net or an accumulator battery such as a motor car battery. The series resistance 29 with the switch can also be subdivided. It adapts the voltage obtained from the current source to the motor 12 of the elecric motor 10 unless the voltage happens to coincide with the rated voltage of the motor 12.

In the embodiment of FIGURE 3 the electric motor unit 10a is substantially identical to the electric motor unit 10 shown in FIGURES 1 and 2 with the exception of the casing or the housing 32 which has a somewhat different configuration. The separate but complementary unit 33a contains a current source such as the battery 21 and the rectifier 17, while the battery-charging means composed of a capacitor, two reistances, and plug pins are provided in an additional, third unit shown in FIGURE 4.

The electric motor unit 10a with the razor head 13 of an electric razor are proivded in the casing 32. The battery 21 and the rectifier 17 of the battery unit are proviced in the housing 33. Both housings 32 and 33 have a planar side wall 34 and 35, respectively, which face each other when the electric motor unit driving the work-performing element, such as the blades of an electric razor and the battery unit are joined together to form the ready-to-operate hand gadget such as an electric razor. In the planar surface 34 there is mounted the pair of plug pins 14 projecting to the outside and in the planar side wall 35 of the battery unit there is mounted the pair of connector sockets 22 adapted to receive the plug pins 14, thereby connecting the motor with the battery. The two units are held together by the pins 36 mounted at the outer end of the planar side wall 35 and projecting therefrom which are adapted to be inserted into the casing 32 of the electric motor unit through corresponding recesses 36a at the respective outer ends of the planar side wall 34. In the integral hand gadget formed of the joined units 10a and 15a the casings 32 and 33 complement each other so as to give the appearance of one integral form-closed configuration. The advantage of this embodiment is easily apparent from the drawing. The gadget shown in FIGURE 3 is smaller in size and weight and therefore easier to handle.

If the battery 21 of the battery unit 15a is exhausted it will have to be connected with the third, the battery-charging unit shown in combination with the battery unit in FIGURE 4. The battery-charging unit 15b consists of a housing 37 containing the charging capacitor 18, the series resistance 19, and the discharge resistance 20. The capacitor 18 is connected via the series resistance 19 with one of the two plug pins 24, the two plug pins being connected via the discharge resistance 20, while the other of the two plug pins 24 is connected with one of the two connector sockets 38, the other connector socket being connected with the charging capacitor 18.

The connector sockets 38 are adapted to receive the plug pins 36 of the battery unit 15a, thereby joning the latter with the battery-recharging unit 15b. Contrary to the previously described embodiments, the plug pins 36 with the corresponding connector sockets 38 are used both for mechanically connecting the two units with each other and as electrical connecting means. The plug pins 24 project from the casing 37 of the battery-recharging unit through the planar wall 39 of a protruding portion 39a opposite to the planar side wall 37a facing the side wall 35 of the battery unit 15a.

As the rectifier is comparatively small in size and weight it can also be disposed in the housing of the battery-charging unit instead of in the battery unit 15a; this can be done whenever required by the construction of the particular hand gadget.

In order to avoid the joining of two non-complementary units, the plug and socket connections 36, 38, and 22, 14 are non-symmetrically or irregularly disposed so that only the plug pins 14 can be inserted into the connector sockets 22 only, and only the plug pins 36 can be inserted into the connector sockets 38 only.

The gadget shown in FIGURE 5 is identical to the one shown in FIGURE 2 with the exception of the housing 11a and 27a forming the integral housing of the gadget when joined, which housing is smaller and easier to handle. Furthermore, the plug pins 38' are provided in the casing 27a adapted to be inserted into the corresponding holes in the adjoining side wall 25a of the housing 11a.

The switching of the entire gadget is shown in FIGURE 6 wherein the dash-dotted line indicates the division of the entire gadget into two separate but mutually complementary units. One pole of the plug 28 is directly connected to the Graetz-rectifier-circuit 17 while the other pole is connected to the rectifier-circuit 17 via the series resistance 19 and the capacitor 18. The use of a capacitor instead of an ohmic resistance is preferable because less heat is produced and in addition it serves as a protective device in case of connection to a D.C. current supply. The series resistance 19 serves as a protection in case of a break-down of the capacitor. The resistance 20 inserted between the poles is used for discharging the capacitor. Of course, it can also be connected in parallel with the capacitor 18 at the D.C. current end. The battery 21 is connected directly to the Graetz-rectifier-circuit 17 and the battery is connected to the switch 40 and the motor 12. This wiring is made possible by virtue of the separation of the entire device into two separate although complementary units so that the motor is disconnected from the battery while the latter is being recharged. The wiring diagram of FIGURE 7 corresponds to the combination of the battery unit with the battery-charging unit as shown in FIGURE 4, while the connection of the combinations of the electric motor unit with the battery unit corresponding to FIGURE 3 is shown in FIGURE 8. In both figures, the dash-dotted line indicates the separation of the integral device into two complementary units, whereas the small circles illustrate the plug and socket connections.

It will be understood that this invention is susceptible to modification in order to adapt it to different usages and conditions, and, accordingly, it is desired to comprehend such modifications within this invention as may fall within the scope of the appended claims.

What is claimed is:

1. Hand gadget of the type having an electric motor, a work-performing element driven by said motor, and a current source; comprising a separate electric motor unit comprising a housing having a planar side wall having two openings, an electric motor in said housing, a work-performing element in said housing and driven by said motor, and a pair of plug pins electrically connected to said motor and mounted against the planar side wall of said housing and projecting therefrom to the outside, a separate battery unit comprising a second housing having a planar side wall, an accumulator battery in said second housing, first means forming a portion of an A.C. charging circuit electrically connected to said battery for charging the same and disposed within said second housing, a pair of plug pins electrically connected to said first means and mounted against the planar side wall of said second housing and projecting therefrom to the outside and adapted for insertion into the openings of a planar side wall of the housing of said electric motor unit, and electrical connecting means for connecting said battery with said electric motor via said pair of plug pins in the housing of said motor unit, a separate battery-charging unit comprising a third housing having a planar side wall having two openings, second means forming the remaining portion of said A.C. charging circuit and disposed within said third housing, a pair of connector sockets in said third housing connected with said second means and adapted to receive said plug pins of said battery unit through said last mentioned openings, thereby forming a complete A.C. battery-charging circuit and connected with said battery, said electric motor unit and said battery unit being adapted to be joined by said plug pins with their respective planar side walls facing each other thus forming the ready-to-operate hand gadget, said battery unit and said battery-charging unit being adapted to be joined by said plug pins with their respective planar side walls facing each other, for recharging said battery and in consequence of which the bulk of the ready-to-operate motor driven hand gadget that is obtained when the motor unit and the battery unit are joined together is substantially less than if the entire A.C. charging circuit were incorporated in the ready-to-operate hand gadget.

2. Hand gadget as described in claim 1, said third housing of said battery-charging unit having a projecting portion opposite to said planar side wall, and comprising a further pair of plug pins mounted in said projecting portion and adapted to connect said second battery charging means with the A.C. mains.

3. Hand gadget as described in claim 1, wherein said second means includes a capacitor in said third housing of the battery-charging unit adapted to adjust the charging current recharging said battery.

4. Hand gadget as described in claim 1, wherein said second means includes a capacitor in said third housing of the battery-charging unit adapted to adjust the charging current recharging said battery, and an ohmic resistance in said third housing and connected in series with said capacitor.

5. Hand gadget as described in claim 1, wherein said first means forming a portion of said A.C. charging circuit is a rectifier.

References Cited by the Examiner
UNITED STATES PATENTS 3,067,373  12/1962  Hopt et al. _____ 320—2
3,109,132  10/1963  Witte _____ 320—2 X JOHN F. COUCH, *Primary Examiner.*

LLOYD McCOLLUM, *Examiner.*

S. WEINBERG, *Assistant Examiner.*